United States Patent
Smith et al.

(10) Patent No.: US 11,228,032 B1
(45) Date of Patent: Jan. 18, 2022

(54) SECONDARY ELECTRODE INCLUDING STYRENE-BUTADIENE RUBBER

(71) Applicant: ZAF ENERGY SYSTEMS, INCORPORATED, Bozeman, MT (US)

(72) Inventors: Hannah S. Smith, Bozeman, MT (US); Andrew F. Souder, II, Joplin, MO (US); Adam Weisenstein, Bozeman, MT (US); Michael J. Gordon, Joplin, MO (US); Melissa D. McIntyre, Butte, MT (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 17/223,152

(22) Filed: Apr. 6, 2021

(51) Int. Cl.
*H01M 4/485* (2010.01)
*H01M 10/24* (2006.01)
*H01M 4/62* (2006.01)

(52) U.S. Cl.
CPC .......... *H01M 4/485* (2013.01); *H01M 4/623* (2013.01); *H01M 4/628* (2013.01); *H01M 10/24* (2013.01)

(58) Field of Classification Search
CPC .................................................. H01M 4/485
See application file for complete search history.

(56) References Cited

U.S. PATENT DOCUMENTS

| | | | |
|---|---|---|---|
| 5,863,676 A * | 1/1999 | Charkey | H01M 4/244 429/229 |
| 8,652,684 B2 | 2/2014 | Bernard et al. | |
| 9,972,875 B2 | 5/2018 | Kakeya et al. | |
| 10,044,016 B2 | 8/2018 | Kakeya et al. | |
| 10,770,717 B2 | 9/2020 | Sato et al. | |
| 2006/0067876 A1* | 3/2006 | Zhu | H01M 4/244 423/594.14 |
| 2012/0153220 A1* | 6/2012 | Watanabe | C22C 30/06 252/182.1 |
| 2016/0164106 A1* | 6/2016 | Sopchak | H01M 4/8605 429/405 |
| 2018/0086646 A1* | 3/2018 | Lacoste | B01J 35/002 |
| 2020/0365953 A1* | 11/2020 | Pham | H01M 4/623 |

FOREIGN PATENT DOCUMENTS

| | | |
|---|---|---|
| CN | 102576827 B | 9/2016 |
| WO | 2010-053257 A2 | 5/2010 |
| WO | 2010-058901 A2 | 5/2010 |

* cited by examiner

*Primary Examiner* — Stephan J Essex
(74) *Attorney, Agent, or Firm* — Brooks Kushman P.C.

(57) ABSTRACT

An electrochemical component has a green secondary electrode including a conductive substrate, homogeneous pre-synthesized calcium zincate in direct contact with the conductive substrate, and a combination of styrene-butadiene rubber and sintered polytetrafluoroethylene binding the conductive substrate and calcium zincate together.

8 Claims, 5 Drawing Sheets

SECONDARY ELECTRODE INCLUDING STYRENE-BUTADIENE RUBBER

TECHNICAL FIELD

This disclosure relates to secondary electrodes and batteries containing the same.

BACKGROUND

A secondary cell may include an anode and cathode.

Chemical reactions of a secondary cell are reversible. When the cell is being charged for example, the anode may become positive and the cathode may become negative. When the cell is being discharged, it behaves like a primary cell.

SUMMARY

An electrochemical component has a green secondary electrode including a conductive substrate, homogeneous pre-synthesized calcium zincate in direct contact with the conductive substrate, and a combination of styrene-butadiene rubber and sintered polytetrafluoroethylene binding the conductive substrate and calcium zincate together.

An electrochemical component has a green secondary electrode including a conductive substrate, homogeneous pre-synthesized calcium zincate in direct contact with the conductive substrate, and a combination of styrene-butadiene rubber and fiber polytetrafluoroethylene binding the conductive substrate and calcium zincate together.

An electrochemical component has a green secondary electrode including a conductive substrate, homogeneous pre-synthesized calcium zincate in direct contact with the conductive substrate, and a combination of styrene-butadiene rubber and ethylene vinyl acetate binding the conductive substrate and homogeneous calcium zincate together.

DETAILED DESCRIPTION

Various embodiments are described herein. The disclosed embodiments, however, are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art. Moreover, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure may be desired for particular applications or implementations.

A challenge of alkaline zinc battery systems is the solubility of the zinc electrode in the alkaline electrolyte. One solution to this issue has been to incorporate calcium hydroxide into the zinc electrode so that calcium zincate is formed in situ. Calcium zincate is a significantly less soluble species of zinc than zinc oxide. Traditionally, zinc oxide and calcium hydroxide have been bound together in an electrode using fibrillated polytetrafluoroethylene.

Recently, in an effort to make alkaline zinc batteries more cost effective and environmentally friendly, there has been a push in the industry to move away from fibrillated electrodes, which require an organic solvent, and to develop a water based casting system for the zinc electrode. Calcium hydroxide is a difficult material to incorporate into a stable water-based slurry as it reacts with many common gelling agents and solidifies. Calcium hydroxide also tends to clump in slurries, making it difficult to disperse, resulting in an inhomogeneous electrode. When the zinc electrode is inhomogeneous, the calcium hydroxide cannot be fully utilized to form calcium zincate in situ during charge/discharge cycling of the battery. Some water-based binders also excessively coat the active material making it difficult for the zinc oxide and calcium hydroxide to form calcium zincate in situ as well as preventing electrolyte from coming into contact with the active material. Additional challenges involve finding an aqueous based binder that does not contain a surfactant, produces electrodes durable enough for handling, is stable in the battery system, and does not coat the active particle to a degree that inhibits them from properly interacting with the electrolyte.

Figure 1:
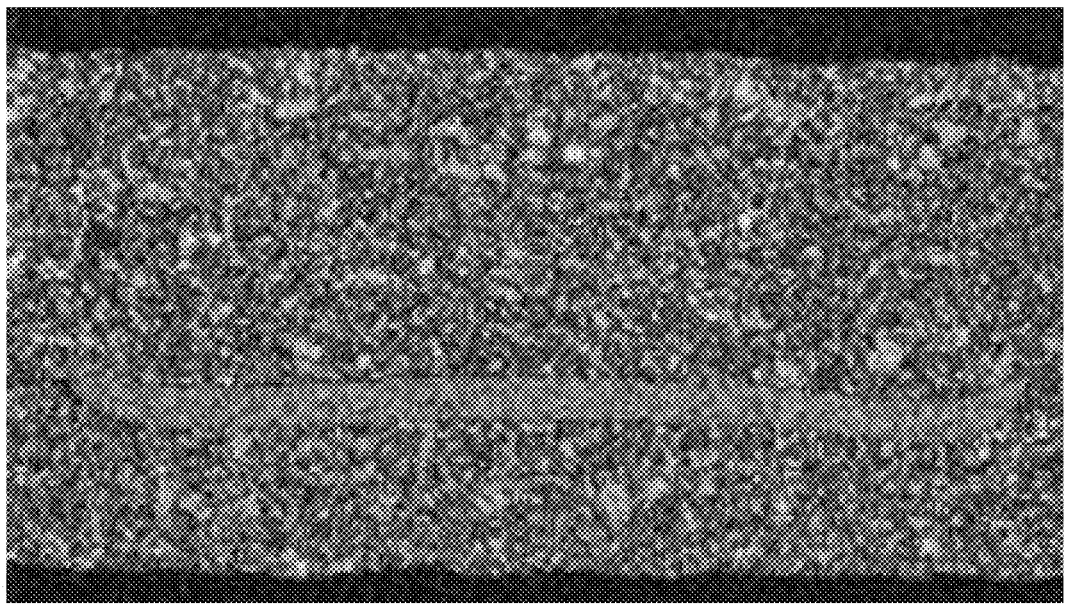
FIG. 1 is an elemental image map of an electrode formed from zinc oxide and calcium hydroxide.
Figure 2:
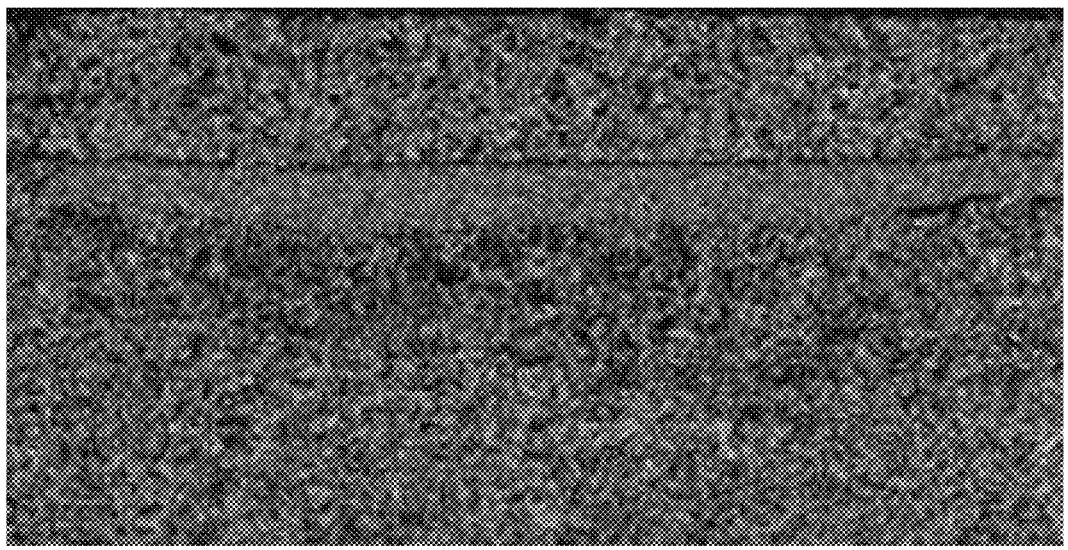
FIG. 2 is an elemental image map of an electrode formed from pre-synthesized calcium zincate.

To overcome the difficulty of using calcium hydroxide in a water-based slurry, calcium zincate can be pre-synthesized (ex-situ) and incorporated directly into the slurry mixture, for example, where the green secondary electrode includes zinc oxide at a ratio of no more than 1:2 zinc oxide to calcium zincate by mass. Calcium zincate does not have the same adverse solidification reactions with gelling agents as calcium hydroxide, resulting in a stable slurry and a homogeneous electrode. FIG. 1, for example, shows clumps of calcium hydroxide in an electrode containing calcium hydroxide and zinc oxide, whereas FIG. 2 shows the homogeneity of an electrode containing pre-synthesized calcium zincate.

The pre-synthesized calcium zincate particles also have a larger particle size with more significant and protruding angles than zinc oxide and calcium hydroxide, making it less susceptible to the adverse effects of coating that effect the combination of zinc oxide and calcium hydroxide. Styrene-butadiene rubber has shown promising results in aqueous cast lithium-ion anodes. The zinc electrodes made from styrene-butadiene rubber are reasonably durable. Cells containing electrodes fabricated with high amounts of styrene-butadiene rubber exhibit low utilization during cycle life testing as well as elevated charge times due to the styrene-butadiene rubber excessively coating the active material. When the styrene-butadiene rubber content in the slurry is decreased, cycling performance improves since the active material is not adversely coated. The electrodes constructed from the lower styrene-butadiene rubber slurry, however, are not suitably durable. Sintered polytetrafluoroethylene fibers or ethylene vinyl acetate can be combined with a lower styrene-butadiene rubber content slurry to produce durable, high performance electrodes. The styrene-butadiene rubber provides cohesion while the polytetrafluoroethylene fibers and ethylene vinyl acetate provide additional structural support.

Figure 3:
FIG. 3 is a scanning electron microscope image of calcium zincate with tetragonal structure.
Figure 4:
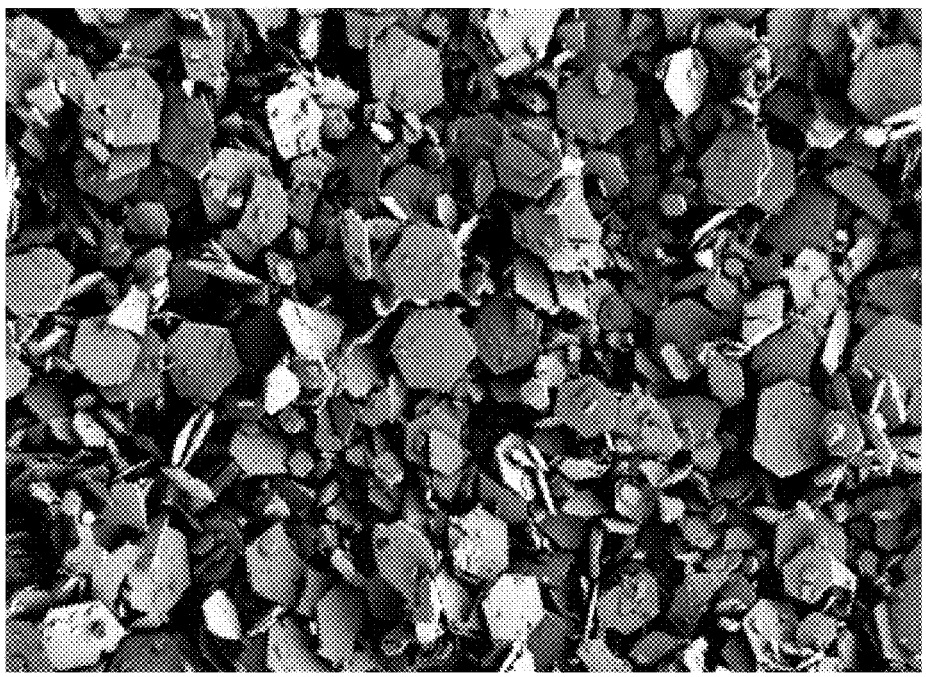
FIG. 4 is a scanning electron microscope image with same magnification as FIG. 3 of calcium zincate with hexagonal structure.
Figure 5:
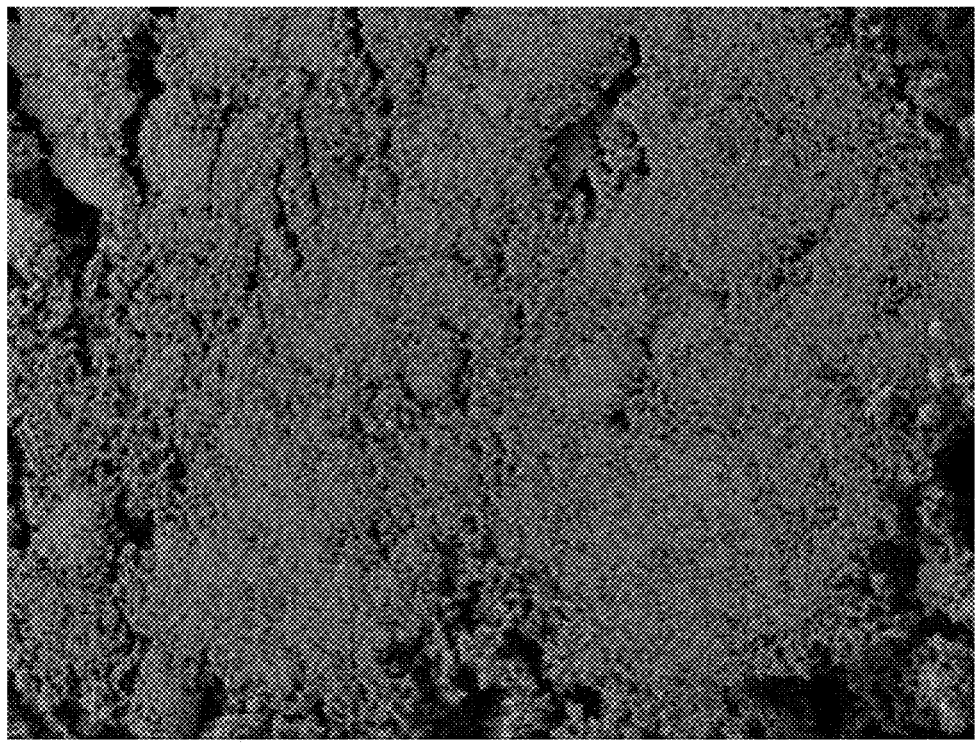
FIG. 5 is a scanning electron microscope image with same magnification as FIG. 3 of zinc oxide.
Figure 6:
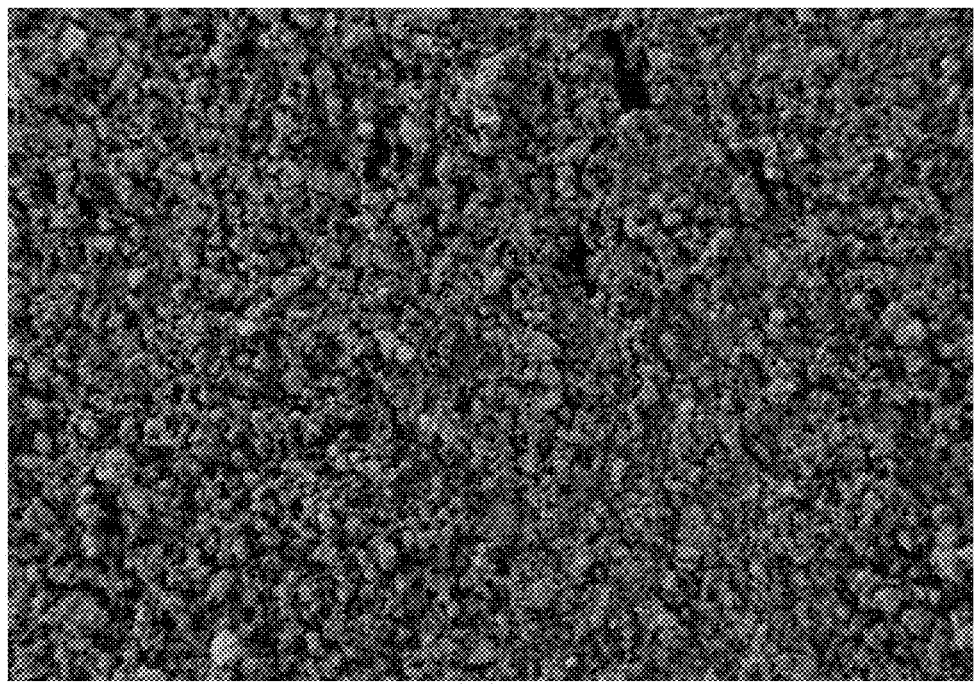
FIG. 6 is a scanning electron microscope image with same magnification as FIG. 3 of calcium hydroxide.

The combination of calcium zincate, styrene-butadiene rubber, and sintered polytetrafluoroethylene fibers or ethylene vinyl acetate is an effective combination for aqueous cast zinc electrodes. The ratio of the combination of styrene-butadiene rubber and polytetrafluoroethylene to active species (calcium zincate or a combination of calcium zincate and zinc oxide) may be no more than 1:9 combination to active species by mass. Likewise, the ratio of the combination of styrene-butadiene rubber and ethylene vinyl acetate to active species may be no more than 1:9 combination to active species by mass. The slurry is stable, and the calcium zincate does not react and solidify with the gelling agents. Conversely, calcium hydroxide is partially soluble in water and the calcium cations react with the gelling agents causing the slurry to seize up and solidify. Because calcium zincate is not significantly soluble in water, there are fewer cations to react with the gelling agent resulting in a castable slurry. Styrene-butadiene rubber at the proper loading does not excessively coat the calcium zincate and is stable in the battery system. The calcium zincate of FIGS. 3 and 4 have large and sharply pointed particles, which makes it unexpectedly less susceptible to coating as compared with the small zinc oxide and calcium hydroxide particles of FIGS. 5 and 6 respectively, making the combination of calcium zincate and styrene-butadiene rubber uniquely and unexpectedly successful as it was expected that the styrene-butadiene rubber would fully coat the calcium zincate, isolating it from the electrolyte. The styrene-butadiene rubber, however, likely only partially coats the calcium zincate, forming a protective layer over part of the particle while the points remain exposed and reactive.

The styrene-butadiene rubber also stabilizes the polytetrafluoroethylene fibers in the aqueous slurry. This may be due to parts of the styrene-butadiene rubber molecule being hydrophobic and other parts being hydrophilic, causing it to act as a dispersive agent. The polytetrafluoroethylene fibers and ethylene vinyl acetate add structure to the electrode beyond that which is possible using just styrene-butadiene rubber for a given amount of binder, which allows them to be more handleable during battery manufacturing, and provides a framework during cycle life, which helps to combat zinc shape change. The polytetrafluoroethylene fibers and ethylene vinyl acetate also create pathways for gas formed in the electrode to escape, preventing trapped gas within the electrode from accumulating and allowing more of the electrode to remain active for longer.

Figure 7:
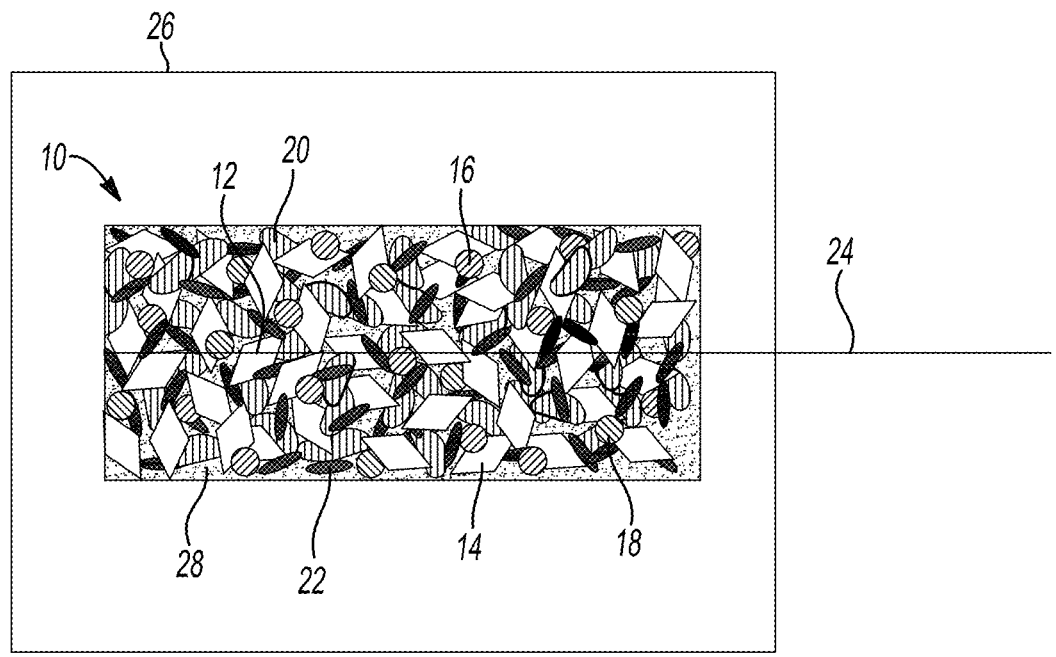
FIG. 7 is a schematic view of an electrode with styrene-butadiene rubber and polytetrafluoroethylene.

Referring to FIG. 7, a green secondary electrode 10 includes a conductive substrate 12 (e.g., aluminum, brass, bronze, carbon, conductive polymers, copper, stainless steel, steel, tin, titanium, zinc, or combinations thereof), which may be for example a foil with or without perforations, expanded metal, or foam, calcium zincate 14, nucleation additives 16 (e.g., bismuth, cadmium, lead, mercury, tin, zinc, or oxides and hydroxides thereof), hydrogen suppressing additives 18 (e.g., bismuth, cadmium, indium, lead, mercury, tin, zinc, or oxides and hydroxides thereof), a combination of styrene-butadiene rubber 20 and polytetrafluoroethylene 22, and a tab 24. The conductive substrate 12 is in direct contact with the tab 24. The calcium zincate 14 is homogeneous and is in direct contact with the conductive substrate 12. The combination of styrene-butadiene rubber 20 and polytetrafluoroethylene 22 bind the conductive substrate 12, calcium zincate 14, nucleation additives 16, and hydrogen suppressing additives 18 together. In the example of FIG. 7, the polytetrafluoroethylene 22 is sintered polytetrafluoroethylene. In this and other examples, the polytetrafluoroethylene 22 may be fiber polytetrafluoroethylene or sintered fiber polytetrafluoroethylene. Also, the conductive substrate 12 can also be coated with other protective materials.

The green secondary electrode 10 may be used within a battery 26. As such, electrolyte 28 may fill void spaces defined by the green secondary electrode 10.

Figure 8:
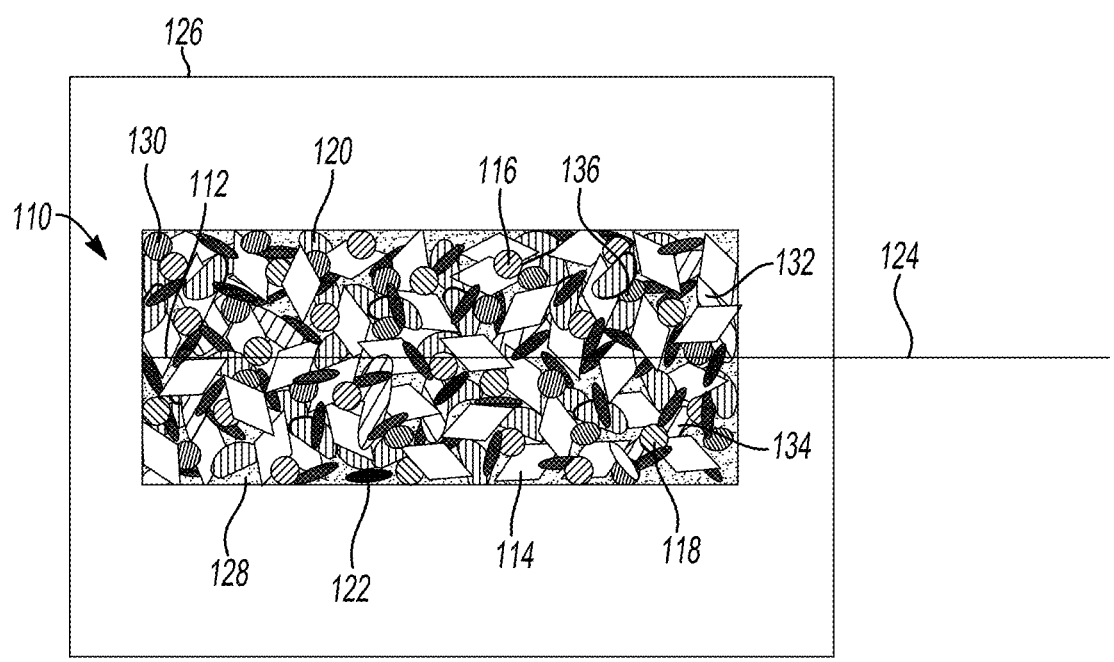
FIG. 8 is a schematic view of an electrode with styrene-butadiene rubber and polytetrafluoroethylene fibers.

Referring to FIG. 8, a green secondary electrode 110 includes a conductive substrate 112, calcium zincate 114, nucleation additives 116, hydrogen suppressing additives 118, a combination of styrene-butadiene rubber 120 and polytetrafluoroethylene 122, and a tab 124. The green secondary electrode 110 also includes a zinc stabilization additive 130, a plasticizer 132 (e.g., polyethylene, polyethylene glycol, polyvinyl acetate, or polyvinyl alcohol), a gelling agent 134 (e.g., carboxy methyl cellulose or hydroxyl ethyl cellulose) and an absorbent additive 136 (sodium polyacrylate or super absorbent polymers). Similar to the example of FIG. 7, the green secondary electrode 120 may be used within a battery 126 along with electrolyte 128 filling the void spaces thereof.

Figure 9:
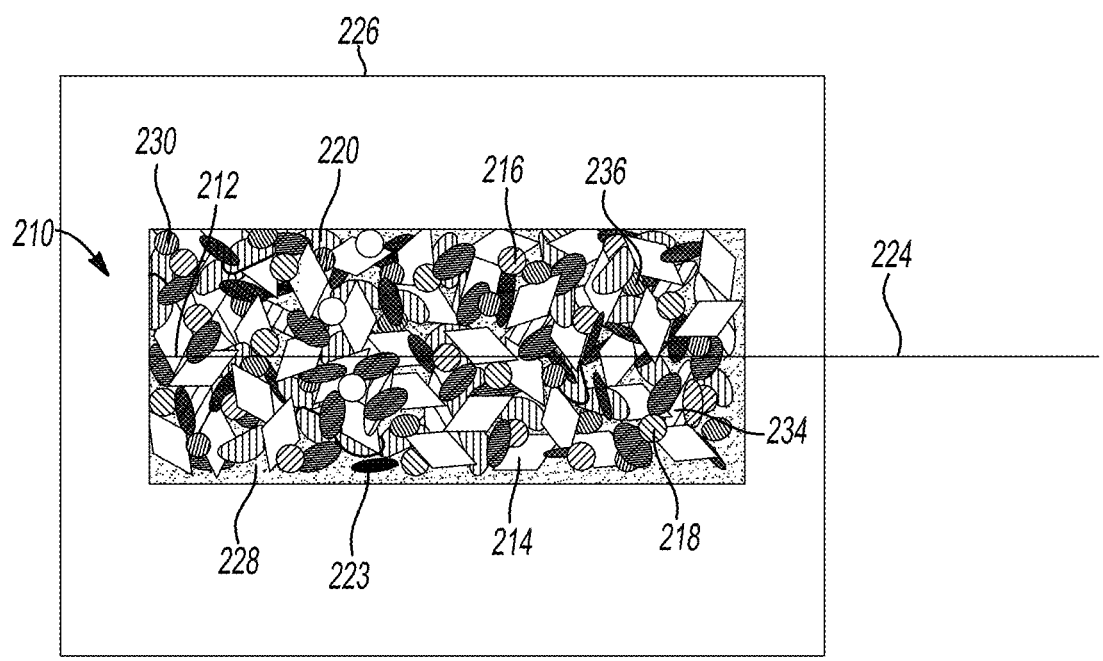
FIG. 9 is a schematic view of an electrode with styrene-butadiene rubber and ethylene vinyl acetate.

Referring to FIG. 9, a green secondary electrode 210 includes a conductive substrate 212, calcium zincate 214, nucleation additives 216, hydrogen suppressing additives 218, a combination of styrene-butadiene rubber 220 and ethylene vinyl acetate 223, and a tab 224. The green secondary electrode 210 also includes a zinc stabilization additive 230, a plasticizer 232, a gelling agent 234, and an absorbent additive 236. The combination of styrene-butadiene rubber 220 and ethylene vinyl acetate 223 binds the conductive substrate 212, calcium zincate 214, nucleation additives 216, and hydrogen suppressing additives 218 together. Similar to the examples of FIGS. 7 and 8, the green secondary electrode 220 may be used within a battery 226 along with electrolyte 228 filling the void spaces thereof.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrochemical component comprising:
a non-sintered green secondary electrode including a conductive substrate, homogeneous pre-synthesized calcium zincate in direct contact with the conductive substrate, and a combination of styrene-butadiene rubber and sintered polytetrafluoroethylene binding the conductive substrate and calcium zincate together.

2. The electrochemical component of claim 1, wherein the combination further includes ethylene vinyl acetate.

3. The electrochemical component of claim 1, wherein the non-sintered green secondary electrode further include nucleation and hydrogen suppressing additives, and wherein the combination further binds the additives together with the conductive substrate and calcium zincate.

4. The electrochemical component of claim 1, wherein the calcium zincate has a hexagonal or tetragonal structure.

5. The electrochemical component of claim 1, wherein the non-sintered green secondary electrode further includes zinc oxide at a ratio of no more than 1:2 zinc oxide to calcium zincate by mass.

6. The electrochemical component of claim 5, wherein the combination is at a ratio of no more than 1:9 combination to calcium zincate by mass or 1:9 combination to calcium zincate and zinc oxide by mass.

7. The electrochemical component of claim 1, wherein the non-sintered green secondary electrode further includes a gelling agent, a plasticizer, an absorbent additive, or a zinc stabilization additive.

8. A battery comprising:
the electrochemical component of claim 1.

* * * * *